E. R. SPELLMAN.
DRAFT EQUALIZER.
APPLICATION FILED MAY 1, 1913.
1,078,386.
Patented Nov. 11, 1913.
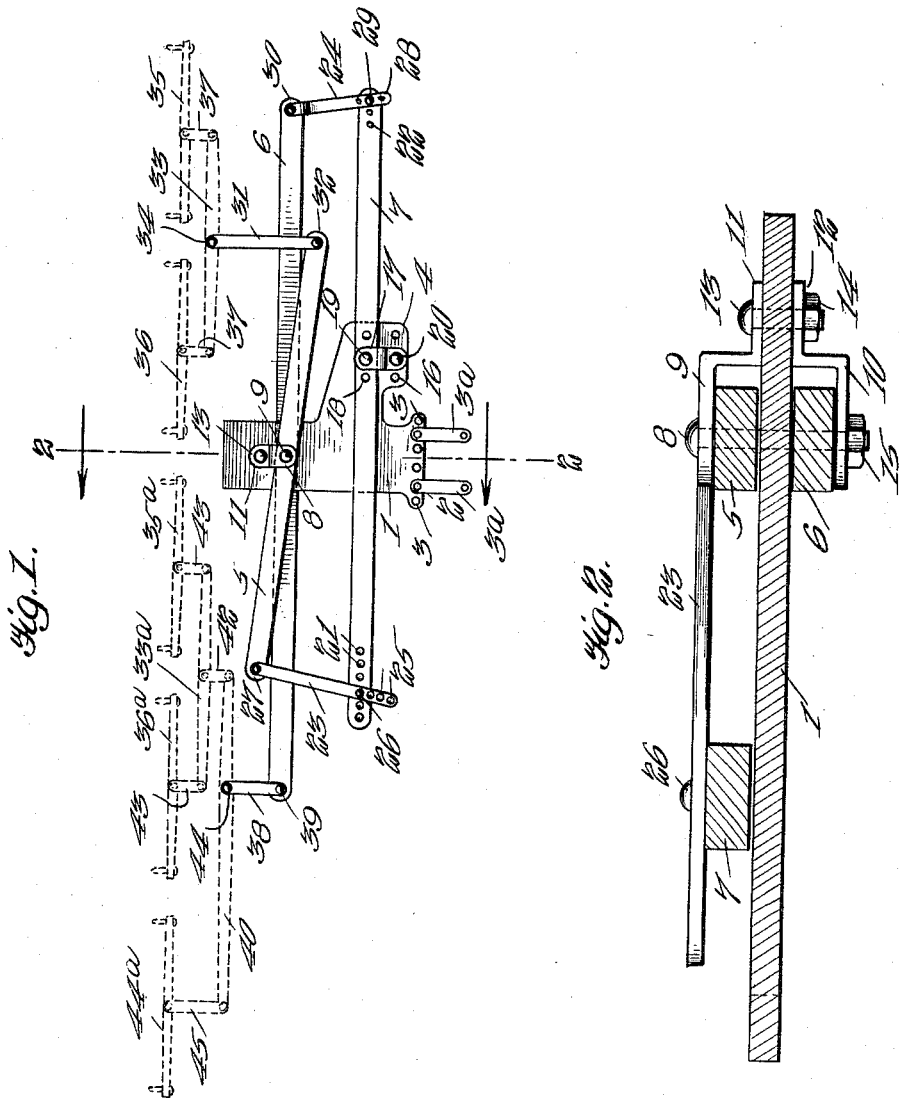
INVENTOR
EDWARD R. SPELLMAN,
ATTORNEYS

UNITED STATES PATENT OFFICE.

EDWARD R. SPELLMAN, OF WALLA WALLA, WASHINGTON.

DRAFT-EQUALIZER.

1,078,386.  Specification of Letters Patent.  Patented Nov. 11, 1913.

Application filed May 1, 1913. Serial No. 764,817.

*To all whom it may concern:*

Be it known that I, EDWARD R. SPELLMAN, a citizen of the United States, and a resident of Walla Walla, in the county of Walla Walla and State of Washington, have invented a new and useful Improvement in Draft-Equalizers, of which the following is a specification.

My invention is an improvement in draft equalizers, and has for its object to provide an equalizer of the character specified, by means of which five draft animals may be coupled together for pulling a plow and so arranged that the draft will be equally distributed, and the swingle-trees will be so balanced that the draft animals will pull in proper position alongside each other and with but one draft animal in the furrow.

In the drawings: Figure 1 is a top plan view of the equalizer, and Fig. 2 is a section on the line 2—2 of Fig. 1 looking in the direction of the arrows.

The present embodiment of the invention comprises a plate 1 of suitable material, having its rear end enlarged laterally as indicated at 2, and provided with a transverse series of openings for connecting the said plate with the plow. The plate is also provided with a lateral extension 4, at one side edge, and bars 5 and 6 are connected with the plate, while a bar 7 is connected with the extension.

The bar 5 is arranged above the plate and the bar 6 below the plate, both being near the front end thereof and the said bars 5 and 6 are held in place on the plate by means of a bolt 8, and clips 9 and 10. Each of the clips 9 and 10 is offset inwardly at its front end as shown at 11 and 12 respectively, to lap against the upper and lower faces of the plate 1, and a bolt 13 is passed through the said offset ends of the plate and is engaged by a nut 14, beneath the plate.

The bolt 8 before mentioned, passes through the bodies of the clips 9 and 10, through the bars 5 and 6, and the plate 1, and is engaged by a nut 15 at its lower end. The extension 4 before mentioned, is provided at its free end with a transverse series of openings 16, extending parallel with the openings 3, and a clip 17 is provided for connecting the bar 7 to the extension.

The bar 7 is provided intermediate its ends and near its center with a longitudinal series of openings 18, and a bolt 19 is passed through the body of the clip and one of the said openings. Another bolt 20 is passed through the rear end of the said clip 17, the said rear end being offset downwardly to the face of the extension, and the said bolt 20 engages one of a series of openings 16.

The bar 7 is provided at each end with a longitudinally extending series of openings 21 and 22 respectively, and straps or links 23 and 24 connect the respective ends of the said bar 7 with the adjacent ends of the bars 5 and 6. The link 23 is provided with a longitudinal series of openings 25 at the end adjacent to the openings 21 of the bar 7, and a bolt 26 is passed through one of the said openings, and a registering opening of the series 21. The opposite end of the link 23 is connected to the adjacent end of the bar 5 by means of a bolt 27.

The link 24 is provided with a longitudinal series of openings 28 at the end adjacent to the bar 7, and a bolt 29 is passed through one of the said openings, and through a registering opening of the series 22. The opposite end of the link 24 is offset downwardly to lap against the upper face of the adjacent end of the bar 6 and a bolt 30 connects the said end of the bar to the link.

A link 31 has one of its ends connected to the opposite end of the bar 5 from the link 23 by means of a bolt 32, and an ordinary double-tree 33 is connected intermediate its ends to the front end of the link by means of the bolt 34. Swingle-trees 35 and 36 of ordinary construction are connected to the ends of the double-tree 33, by means of links 37.

A link 38 is connected to the opposite end of the bar 6, from the link 24 by means of a bolt 39, and the opposite end of the link is connected to a bar 40, by means of a bolt 41, the said bolt 41 engaging the bar 40 at a point one-third of the length of the said bar from the inner end of the bar. A double-tree 33$^a$ corresponding to the double-tree 33 is connected to the inner end of the bar 40 by means of a link 42, and swingle-trees 35$^a$ and 36$^a$ are connected with the free ends of the double-tree 33$^a$ by means of links 43. A swingle-tree 44 is connected with the outer end of the bar 40 by means of a link 45.

The bar 5 is pivoted to the plate 1 at its center as is also the bar 6, while the bar 7 is adjustable with respect to the plate, the said bar being connected to the extension, and laterally with respect to the connection of the bars 5 and 6. The pull on the swingle-trees 35 and 36 will cause the link 23 to push with equal force against the adjacent end of the bar 7, and the opposite end of the said bar 7 will push against the adjacent end of the bar 6 with approximately the same force as the link 23 pushes against the opposite end of the bar 7.

The swingle-trees 35ª and 36ª are balanced on the link 38 by the swingle-tree 44 on account of the arrangement of the bar 40. By the proper adjustment of the connection between the links 23 and 24 with the bar 7, and by the proper adjustment of the connection between the bar 7 and the extension, the draft upon the respective ends of the bar 6 is equalized so that when three draft animals are pulling against one end of the bar 6 and two against the other end, all of the draft is equal on the two ends, and the said bar stands exactly transverse to the plate 1. The plow will be directly behind the swingle-tree 35 and only the draft animal connected with the said swingle-tree wil be in the furrow, the other four animals walking on the unplowed ground.

Clips 3ª are rigidly connected to the rear end of the plate 1 for connecting the said plate to the plow or other implement or vehicle to be drawn.

I claim:—

1. An equalizer comprising a plate for connection with the plow, said plate having a lateral extension at the side adjacent to the plow, a bar pivoted to the extension intermediate the ends of the bar, a pair of bars pivoted to the plate intermediate the ends of the bars on a common axis, one of the said bars being of greater length and the said bar being connected to the first-named bar at the end adjacent to the extension, the shorter bar being connected to the first-named bar at the opposite end from the extension, a double-tree connected to the free end of the shorter bar, and a bar connected to the free end of the longer bar, said last-named bar having a swingle-tree at its outer end and a double-tree at its inner end and being connected to the longer bar at a point one-third its length from the inner end.

2. An equalizer comprising a plate for connection with the plow, upper and lower bars pivoted on a common axis intermediate their ends to the plate, the upper bar being of lesser length, a third bar arranged behind the first-named bars and pivoted to the plate laterally with respect to the connection of the first-named bars, a connection between the end of the longer bar adjacent to the connection of the last-named bar and the adjacent end of the said last-named bar, a connection between the opposite end of the shorter bar and the adjacent end of the last-named bar, the free ends of the first-named bars having links connected therewith for engagement by draft apparatus, the link at the free end of the longer bar being adapted for connection with a draft bar intermediate the ends thereof, and lateral with respect to the center thereof.

EDWARD R. SPELLMAN.

Witnesses:
FRANK N. GLEIM,
SOILANAR CARROLL.